(12) United States Patent
Wall, II

(10) Patent No.: US 9,873,467 B2
(45) Date of Patent: Jan. 23, 2018

(54) AERODYNAMIC FAIRING ASSEMBLY FOR TRACTOR-TRAILERS

(71) Applicant: WALL GLOBAL LLC, Franklin, TN (US)

(72) Inventor: Billy Russell Wall, II, Franklin, TN (US)

(73) Assignee: Wall Global, LLC., Franklin, TN (US)

( * ) Notice: Subject to any disclaimer, the term of this patent is extended or adjusted under 35 U.S.C. 154(b) by 0 days.

(21) Appl. No.: 15/115,762

(22) PCT Filed: Jun. 8, 2015

(86) PCT No.: PCT/US2015/034737
§ 371 (c)(1),
(2) Date: Aug. 1, 2016

(87) PCT Pub. No.: WO2015/191472
PCT Pub. Date: Dec. 17, 2015

(65) Prior Publication Data
US 2017/0166266 A1    Jun. 15, 2017

Related U.S. Application Data

(60) Provisional application No. 62/009,683, filed on Jun. 9, 2014.

(51) Int. Cl.
*B60J 9/00* (2006.01)
*B62D 35/00* (2006.01)

(52) U.S. Cl.
CPC ................... *B62D 35/001* (2013.01)

(58) Field of Classification Search
CPC .............. B60R 21/205; B60R 21/2338; B60R 21/2346; B60R 2021/0407; A47C 27/087; B62D 35/001; B62D 35/02; B62D 35/007; B62D 35/004; Y02T 10/88
USPC .......... 296/180.2, 180.1, 180.3, 180.4, 180.5
See application file for complete search history.

(56) References Cited

U.S. PATENT DOCUMENTS

| | | | |
|---|---|---|---|
| 2,737,411 A * | 3/1956 | Potter | B62D 35/004 244/130 |
| 4,030,779 A | 6/1977 | Johnson | |
| 4,236,745 A | 12/1980 | Davis | |
| 4,601,508 A | 7/1986 | Kerian | |
| 4,688,851 A | 8/1987 | Moore | |
| 4,702,509 A | 10/1987 | Elliot, Sr. | |
| 4,978,162 A | 12/1990 | Labbe | |
| 5,058,945 A | 10/1991 | Elliot, Sr. et al. | |

(Continued)

*Primary Examiner* — Kiran B Patel
(74) *Attorney, Agent, or Firm* — R. Tracy Crump

(57) ABSTRACT

The fairing assembly uses inflatable wall panels that automatically deploy and retract at certain speeds to provide sturdy, light-weight aerodynamic fairings, which cover and enclose the space between the tractor truck and connected trailers to improve the aerodynamics of the tractor-trailers. The fairing assembly uses a module design and includes two or more panel units, a blower/vacuum and an electronic controller. Each panel unit includes a panel housing and an inflatable wall panel, which inflates and deflates to deploy and retract from its housing. The controller actuates the blower/vacuum to provide a continuous flow of air to the inflatable wall panels during deployment and to draw an air flow from the inflatable wall panels when retracting the panels back into the panel housings.

21 Claims, 11 Drawing Sheets

(56) References Cited

U.S. PATENT DOCUMENTS

| | | | |
|---|---|---|---|
| 5,586,594 A * | 12/1996 | Shapoff | A47G 5/00 160/135 |
| 6,409,252 B1 | 6/2002 | Andrus | |
| 6,846,035 B2 * | 1/2005 | Wong | B62D 35/001 296/180.1 |
| 6,886,882 B2 | 5/2005 | Farlow et al. | |
| 7,147,270 B1 * | 12/2006 | Andrus | B62D 35/004 296/180.1 |
| 7,712,822 B2 | 5/2010 | Pfaff | |
| 7,866,734 B2 | 1/2011 | Mracek | |
| 8,123,281 B2 * | 2/2012 | Perkins | B62D 35/001 296/180.1 |
| 8,444,210 B2 | 5/2013 | Domo et al. | |
| 8,506,004 B1 | 8/2013 | Vogel et al. | |
| 8,622,462 B2 | 1/2014 | Ryan et al. | |
| 9,371,097 B1 * | 6/2016 | Conny | B62D 35/004 |
| 9,637,183 B2 * | 5/2017 | Conny | B62D 35/001 |
| 2011/0068603 A1 * | 3/2011 | Domo | B62D 35/001 296/180.1 |
| 2015/0115651 A1 * | 4/2015 | Conboy | B62D 35/004 296/180.2 |
| 2016/0214660 A1 * | 7/2016 | Conny | B62D 35/001 |
| 2017/0096178 A1 * | 4/2017 | Wall, II | B62D 35/001 |
| 2017/0096179 A1 * | 4/2017 | Wall, II | B62D 35/001 |
| 2017/0097013 A1 * | 4/2017 | Wall, II | F04D 29/5806 |

* cited by examiner

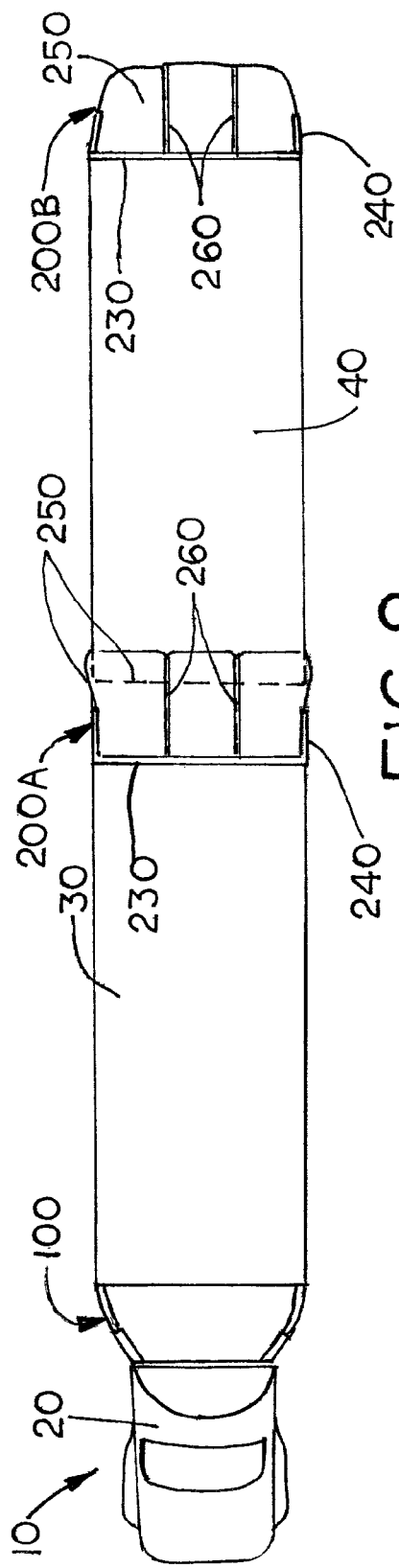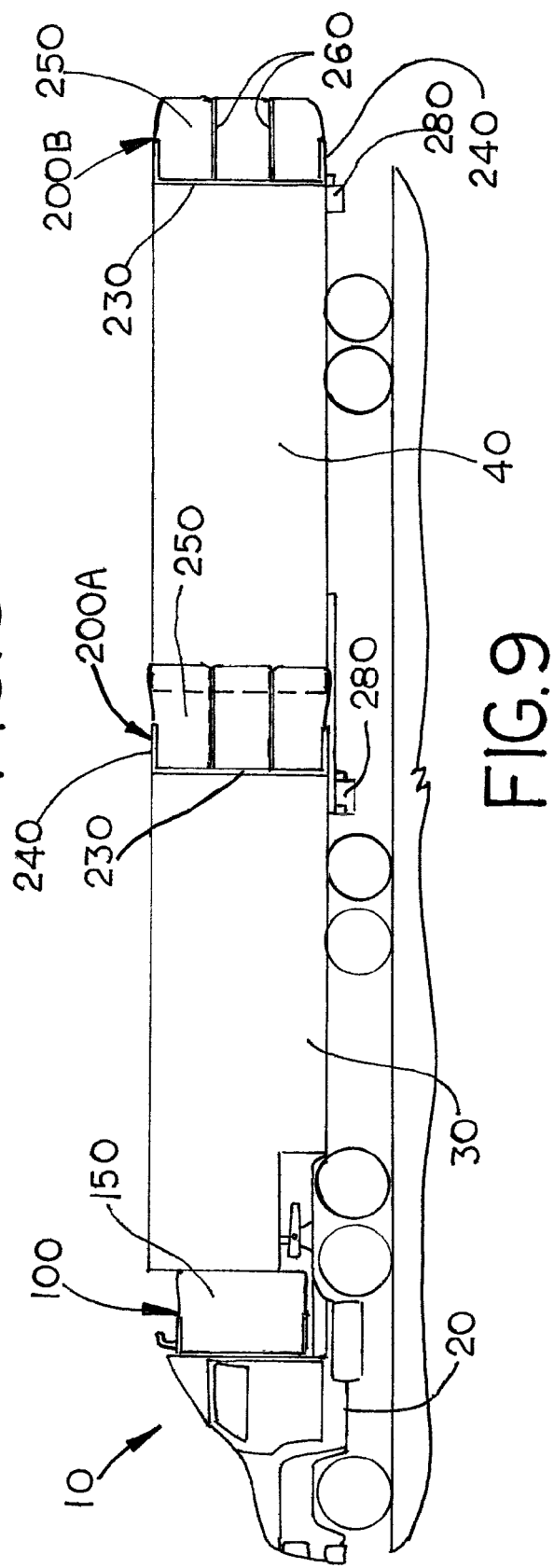

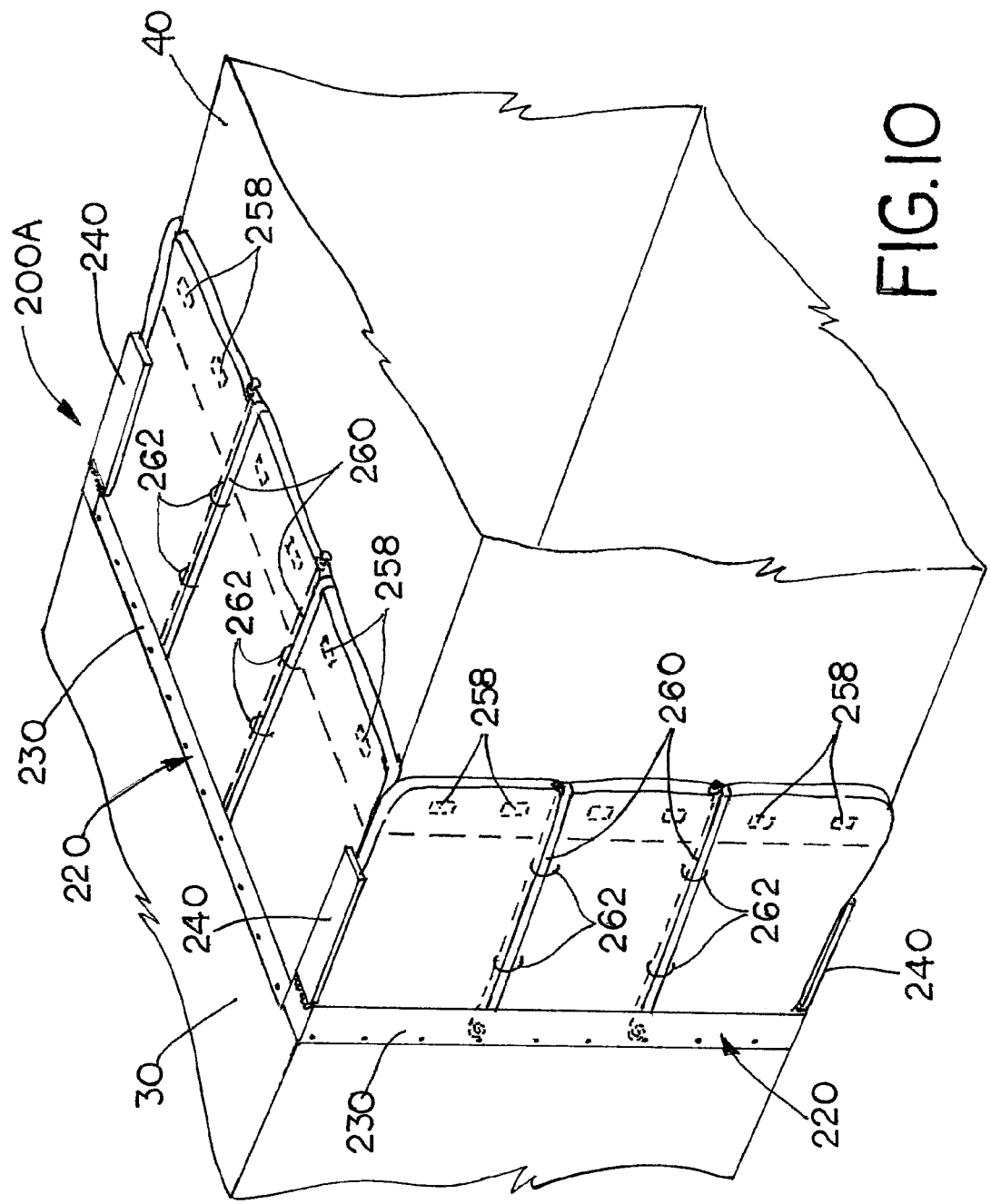

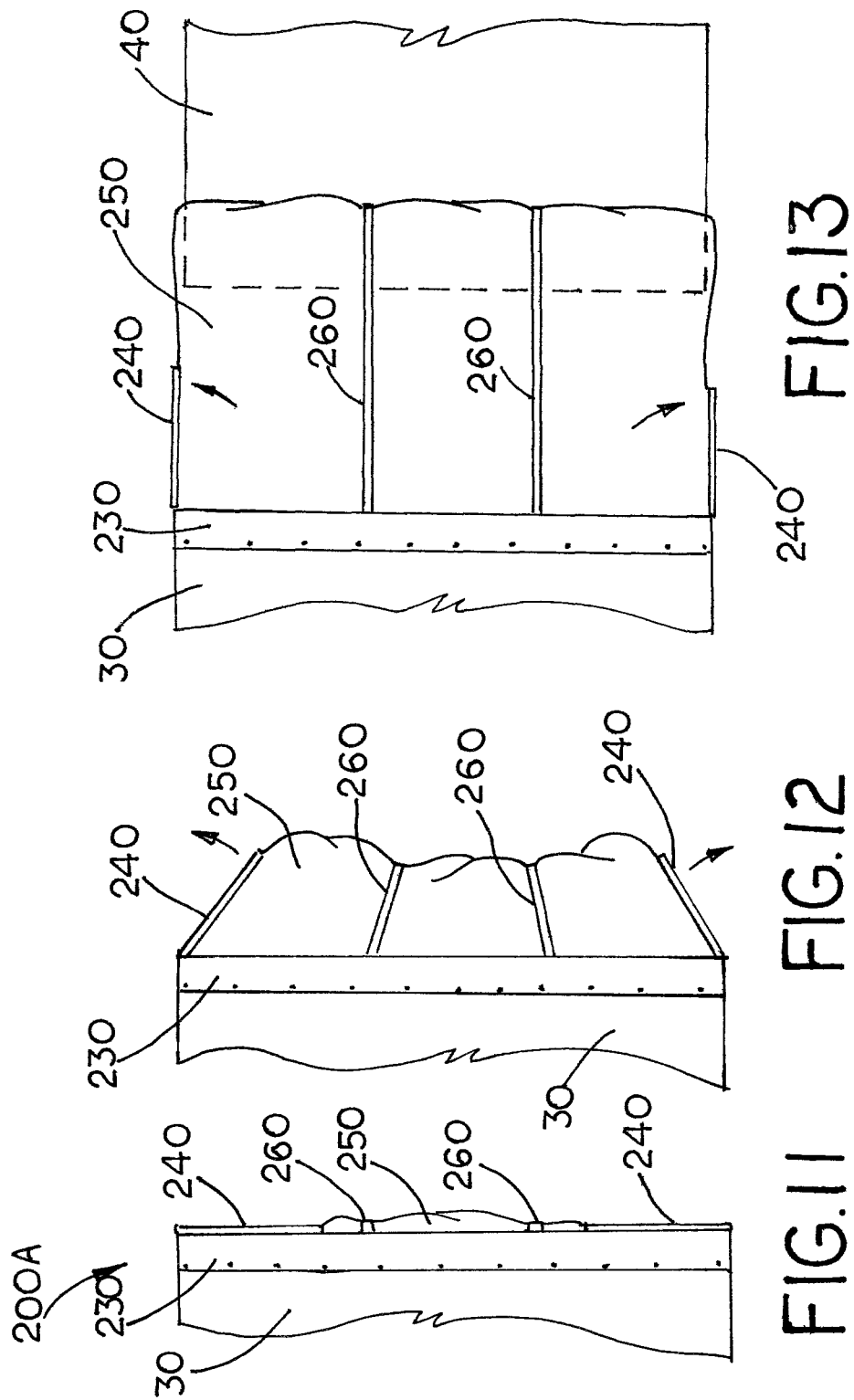

AERODYNAMIC FAIRING ASSEMBLY FOR TRACTOR-TRAILERS

This invention relates to an aerodynamic gap fairing and drag reduction apparatus for tractors and trailers, and in particular an inflatable aerodynamic fairing assembly for improving fuel efficiency of tractor-trailers.

BACKGROUND OF THE INVENTION

The terms "Semi tractor-trailers" or simply "tractor-trailers" commonly refer to the combination of a tractor truck and one or more semi-trailers used for over road transportation of goods and materials. Tractor trucks generally pull a single semi-trailer, but may also pull two or more shorter trailers, commonly known as "pups." Aerodynamic drag is a major contributor to fuel consumption in tractor-trailer commerce, especially at speeds above 40 MPH. Aerodynamic improvements can contribute to fuel savings and provide significant cost reduction.

Fixed air foils and fairings are often mounted to tractor trucks and trailers to provide some degree of aerodynamic improvement. These fixed air foils and fairings are mounted to the tops, sides and bottoms of both tractor trucks and trailers, but cannot cover or enclose the space or "gaps" between the tractor truck and trailers, or between connected trailers and pups. The gaps between the tractor trucks and trailers and between connected trailers is necessary for the articulation of the tractor-trailer; however the gaps between tractor trucks and trailers are a particular source for aerodynamic drag.

A variety of rigid panel fairing systems have been developed to cover or enclose the gaps between tractor trucks and trailers. Rigid panel fairing systems use a variety of mechanical arms, linkages, tracks, slides, motors and actuators to manually or automatically move large rigid fairing panels between stowed and deployed positions enclosing the gaps. Heretofore, such rigid panel fairing systems have met limited success due to their mechanical complexity, functionality, reliability and cost. Structural variations in the design of individual tractor trucks and trailers also make incorporating the use of rigid panel fairing systems difficult. Moreover, rigid panel fairing systems generally cannot completely cover or enclose the gaps between tractor trucks and trailers because of the varying setup of the tractor trucks kingpin, which is generally set for each trailer depending on its intended cargo load.

SUMMARY OF THE INVENTION

The fairing assemblies of this invention use inflatable wall panels that automatically deploy and retract at certain speeds to provide sturdy, light-weight aerodynamic fairings, which cover and enclose the space between the tractor truck and connected trailers to improve the aerodynamics of the tractor-trailers. The fairing assemblies use a module design and include two or more panel units, a blower/vacuum and an electronic controller. Each panel unit includes a panel housing and an inflatable wall panel, which inflates and deflates to deploy and retract from its housing. The controller actuates the blower/vacuum to provide a continuous flow of air to the inflatable wall panels during deployment and to draw an air flow from the inflatable wall panels when retracting the panels back into the panel housings. In one embodiment, the fairing assembly is adapted to mount to behind the cabs of tractor trucks and deploy a pair of inflatable wall panels to cover and enclose the space between a tractor and trailer. In another embodiment, the fairing assembly is adapted to mount behind semi-trailers and deploys three inflatable wall panels to cover and enclose the gap between two connected trailers or pups or to acts as a "boat tail" style airfoil on the back of the trailer.

The use of inflatable wall panels reduces the weight, cost and mechanical complexity, and improves the functionality, reliability and maintenance of the fairing assembly compared to conventional rigid panel systems. The use of inflatable wall panels provides a light-weight extensible aerodynamic fairing that fully covers and encloses the gaps between the tractor trucks and connected trailers. When the inflatable wall panels are deployed, the blower/vacuum provides a continuous high velocity air flow to the inflated wall panels to maintain their structural integrity and ensure a sturdy fairing. While sturdy, the inflatable wall panels are pliable and conform to the contact surfaces of the connected trailers to fully cover and enclose the gaps, while allowing for relative movement between the tractor trucks and trailers and changes in the kingpin setup on the tractor trucks.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 8 is a top view of a tractor-trailer showing the fairing assembly of FIG. 1 mounted behind the tractor truck and a second exemplary embodiment of the fairing assembly of this invention mounted behind both trailers;

FIG. 9 is a top view of a tractor-trailer showing the fairing assembly of FIG. 1 mounted behind the tractor truck and a second exemplary embodiment of the fairing assembly of this invention mounted behind both trailers;

FIG. 10 is a partial perspective view of the second fairing assembly of FIGS. 8 and 9 mounted between the two trailers showing the inflatable wall panels fully deployed;

FIG. 11 is a partial side view of the second fairing assembly of FIG. 10 showing the inflatable wall panels retracted;

FIG. 12 is a partial side view of the second fairing assembly of FIG. 10 showing the inflatable wall panels partially deployed;

FIG. 13 is a partial side view of the second fairing assembly of FIG. 10 showing the inflatable wall panels fully deployed;

DESCRIPTION OF THE PREFERRED EMBODIMENT

Figure 1:
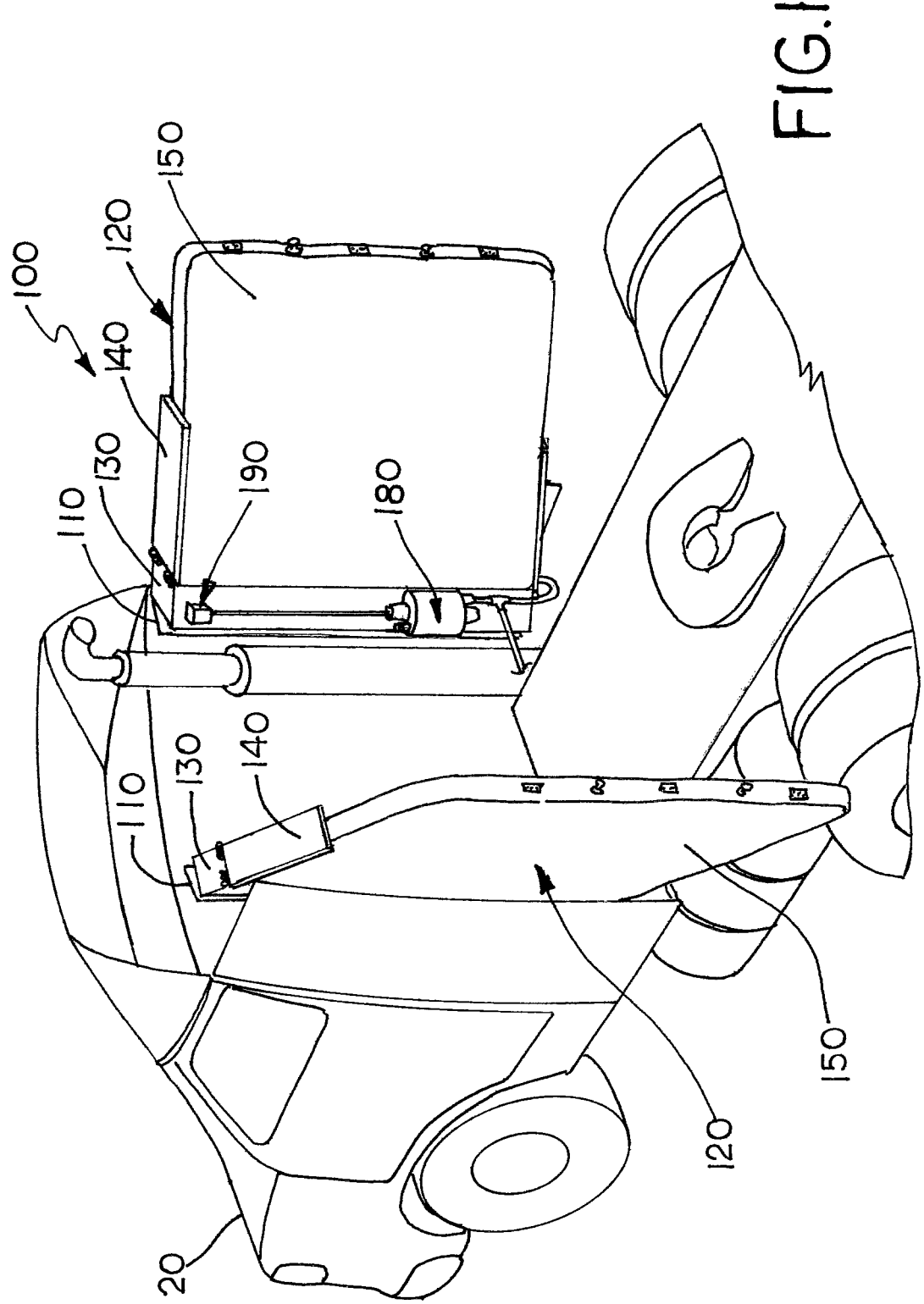
FIG. 1 is a rear perspective view of a tractor truck and an exemplary embodiment of the fairing assembly of this invention shown with the inflatable wall panels deployed.
Figure 2:
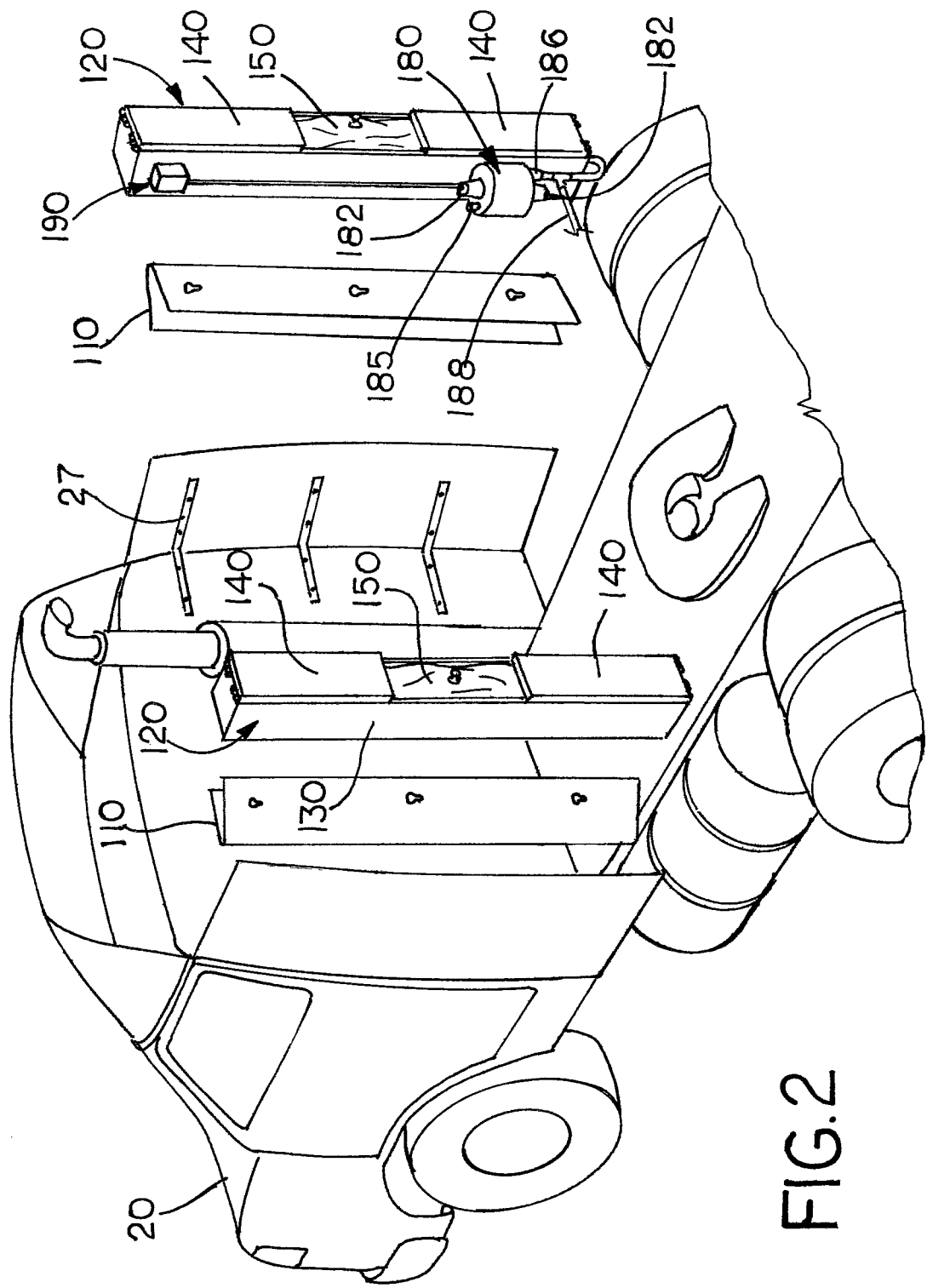
FIG. 2 is a rear perspective partial exploded view of a tractor truck and the fairing assembly of FIG. 1 with the inflatable wall panels retracted.
Figure 3:
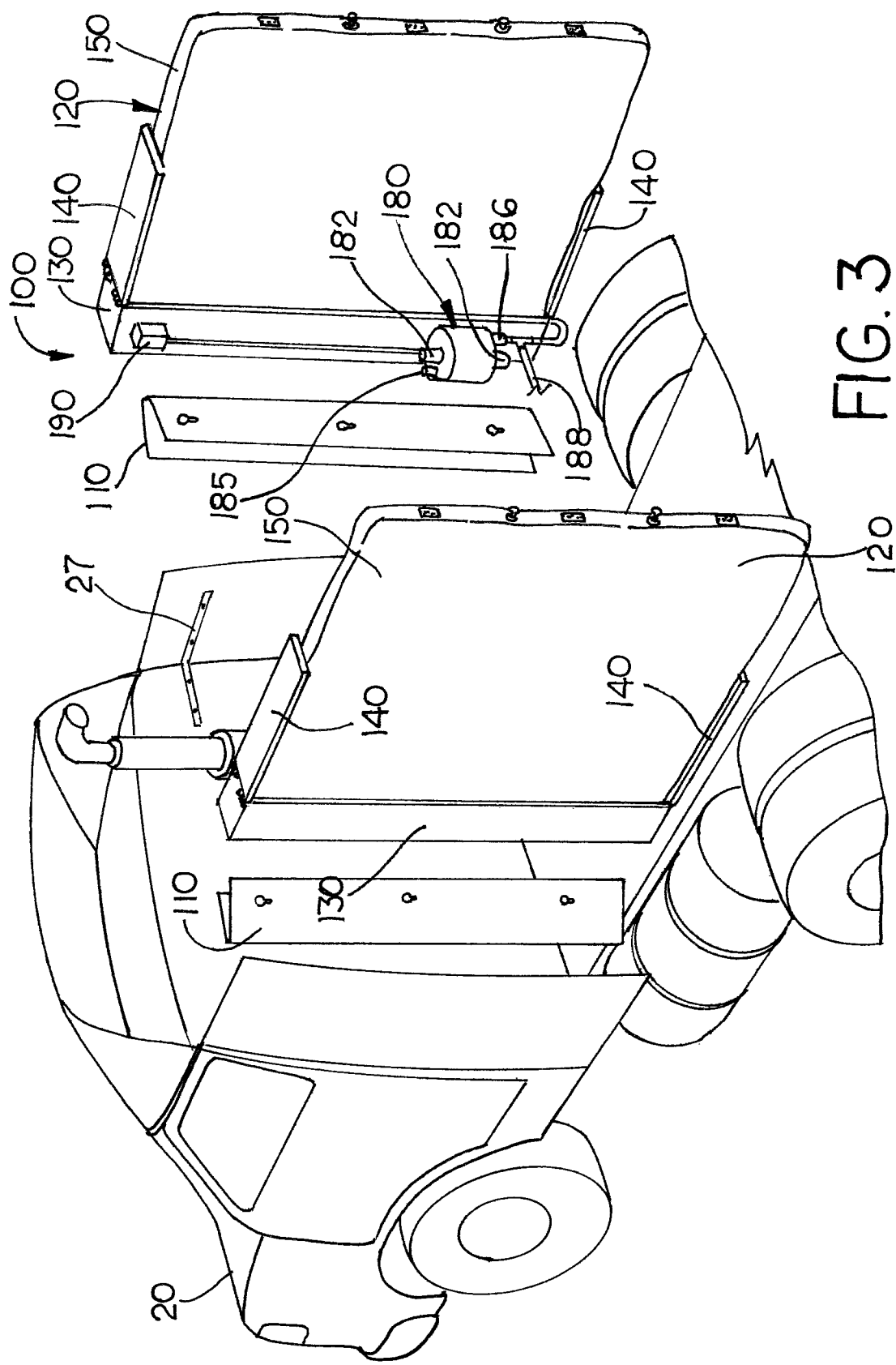
FIG. 3 is a rear perspective partial exploded view of a tractor truck and the fairing assembly of FIG. 1 with the inflatable wall panels deployed.
Figure 4:
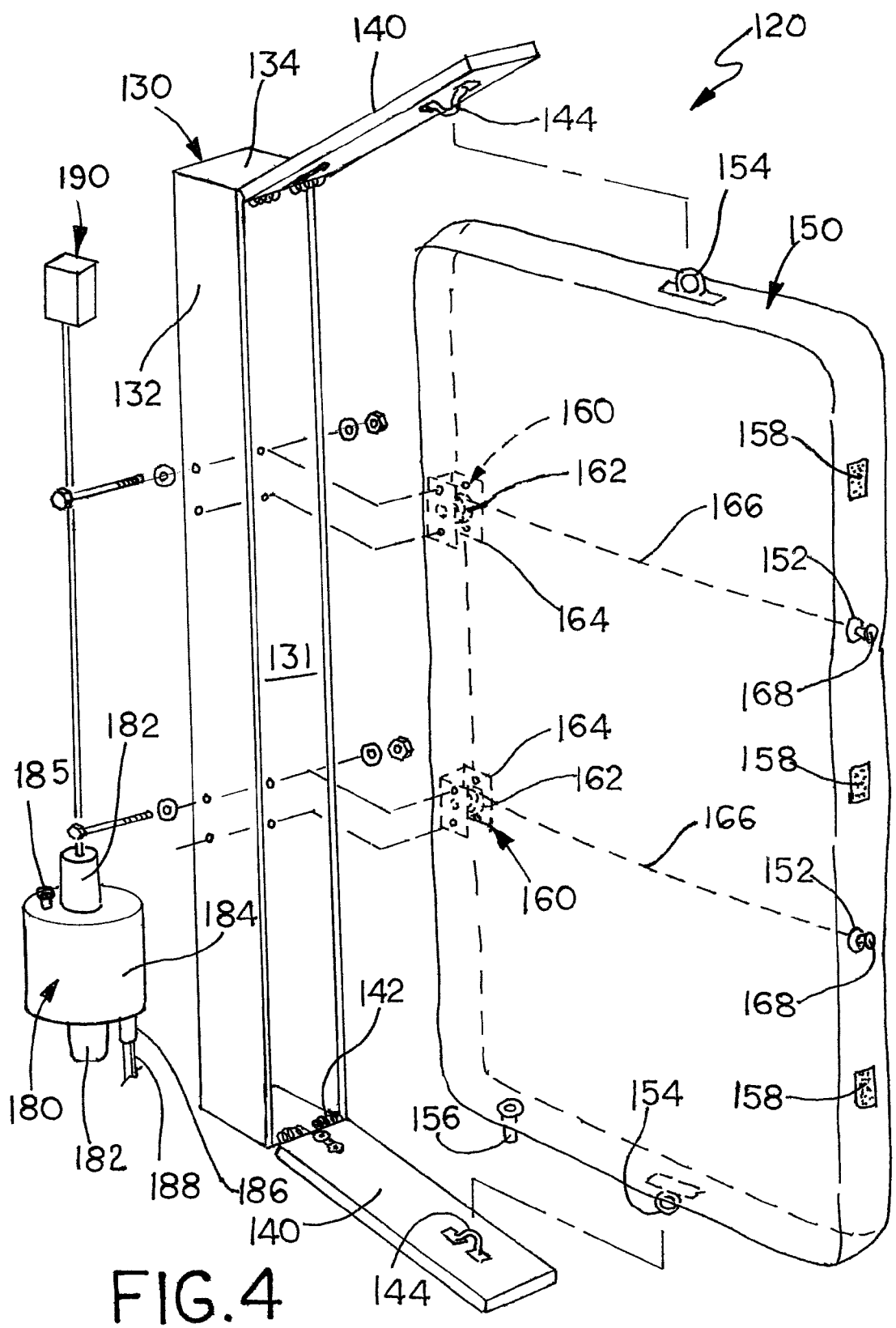
FIG. 4 is a exploded view of the fairing assembly of FIG. 1 showing the inflatable wall panels deployed.
Figure 5:
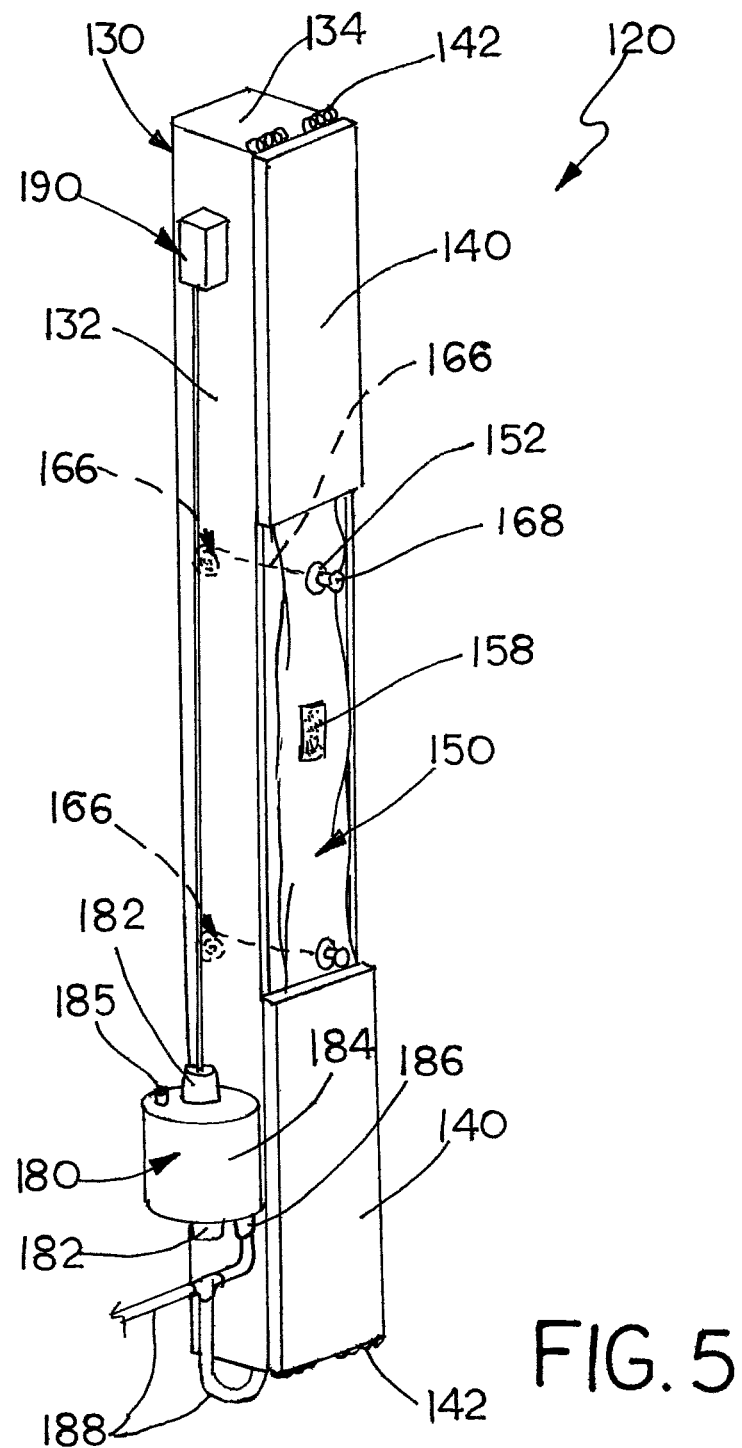
FIG. 5 is a perspective view of the fairing assembly of FIG. 1 showing the inflatable wall panels retracted.
Figure 6:
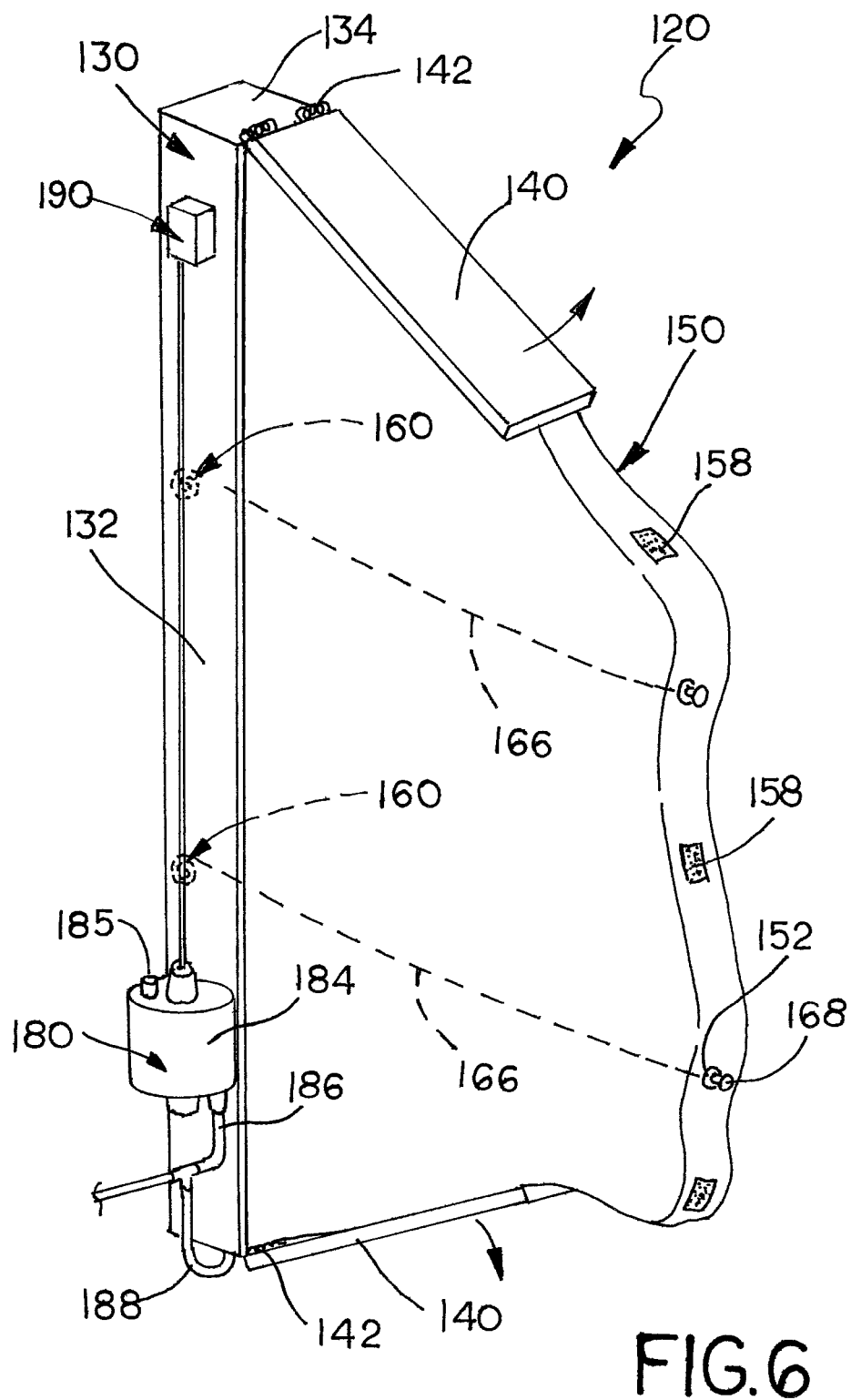
FIG. 6 is the fairing assembly of FIG. 1 showing the inflatable wall panels partially deployed.
Figure 7:
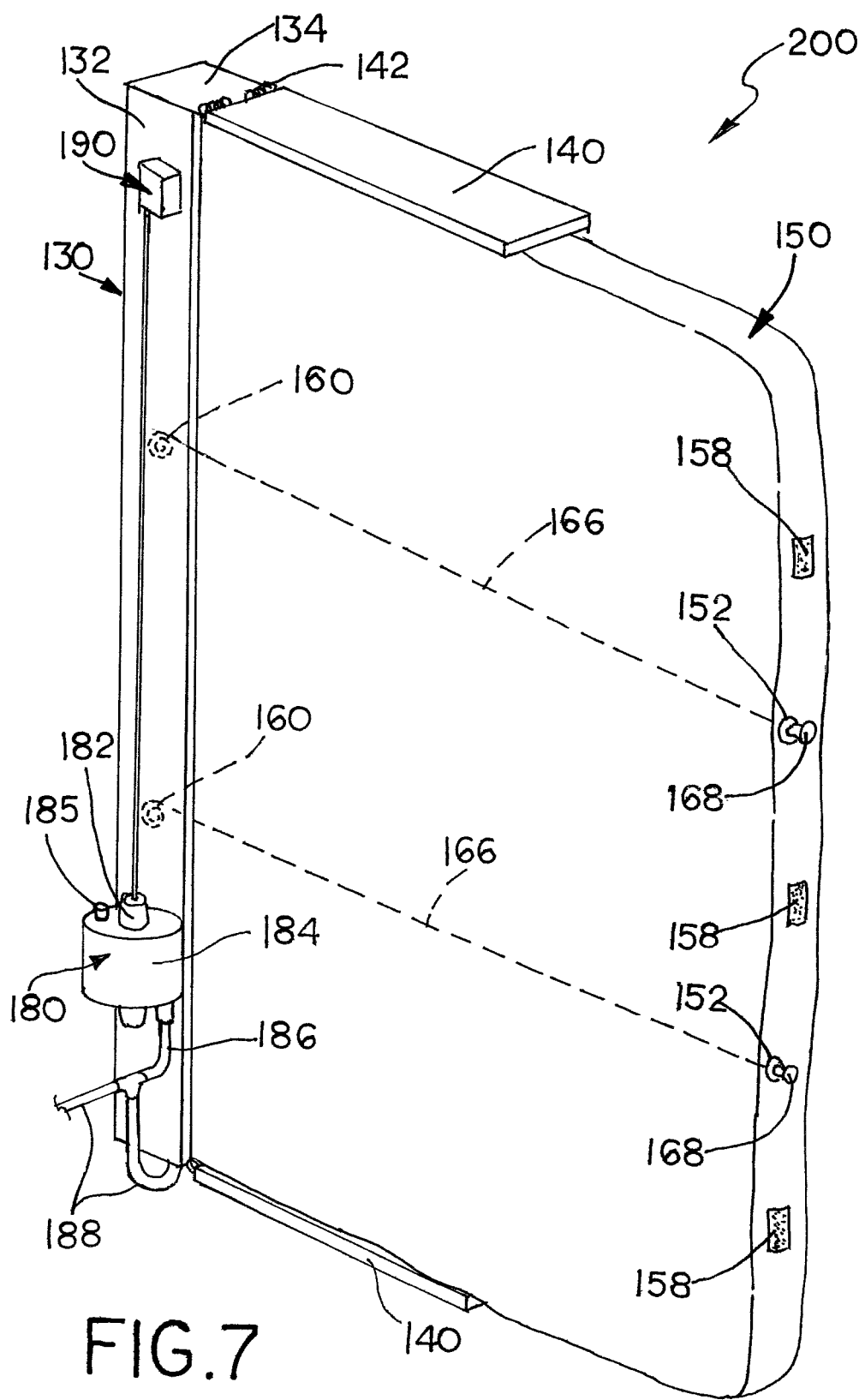
FIG. 7 is the fairing assembly of FIG. 1 showing the inflatable wall panels fully deployed.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

For simplicity of illustration and explanation, the various exemplary embodiments of the fairing assembles of this invention are illustrated in use on conventional tractor-trailer 10, which includes a conventional tractor truck 20 pulling two conventional box style semi trailers 30 and 40. The teaching of this invention may be adapted for any tractor-trailer application, regardless of the make, style, configuration, dimensions or setup of the particular tractor-trailer.

Certain embodiments of the fairing assemblies of this invention are specifically adapted to mount behind the cabs of tractor truck 10 and other embodiments are specifically adapted to the backs of semi trailers. Other embodiments of this invention may be adapted to provide fairings and airfoils that cover or enclose other gaps or open areas of tractor-trailers within the teachings of this invention. Each embodiment of the fairing assemblies of this invention uses inflatable panels that automatically deploy from a panel housing at certain speeds to provide a sturdy, light weight fairing, which encloses or covers the space between the tractor truck and trailer or the space between connected trailers. Each embodiment of the fairing assembles also uses a module design and includes two or more panel units, a blower/vacuum and an electronic controller. Each panel unit includes a panel housing and an inflatable wall panel, which inflates and deflates to deploy and retract from its housing. The controller actuates the blower/vacuum to provide a continuous flow of air to the inflatable wall panels during deployment and to draw an air flow from the inflatable wall panels when retracting the panels back into the panel housings.

Referring now to the drawings, FIGS. 1-9 illustrate an exemplary embodiment of the inflatable aerodynamic fairing assembly of this invention, which is designated generally as reference numeral 100. As shown, fairing assembly 100 is adapted to mount behind the cabs of tractor truck 10 and deploys a pair of inflatable wall panels 150 that act as side fairings covering and enclosing the gap between the tractor truck and the front of the connected semi-trailer 30. Fairing assembly 100 includes a pair of panel units 120, an electrical blower/vacuum 150 and an electronic controller 160.

As shown, each panel unit 120 is detachably hung from a support frames 110 mounted to the brackets 27 of the truck's rigid side fairings 28. Support frames 110 provide a standardized mounting interface for panel units 120. While support frames 110 are mounted to brackets 27, support frames 110 are ideally configured to readily mount to any existing structural component on the back of the track cab 22. Support frame 110 is bolted to brackets 27, but may be directly welding to the brackets or otherwise attached thereto using various clamps, brackets and fasteners to secure the upright in place. Each support frame 110 has a plurality of keyholes 111 that allow panel units 120 to be detachable, but securely hung from the upright.

Each panel unit 120 includes a panel housing 130 and an inflatable wall panel 150. Panel housing 130 is ideally molded, fabricated or otherwise constructed of a durable, but light weight polymer material, but may be constructed of any suitable material or metal. Panel housing 130 is an elongated rectangular upright formed by U-shaped back member 132 and a pair of opposed end walls 134 defining an interior 131 with an open rear face. Back wall 132 includes a plurality of keyed protrusions (not shown), which mate within keyholes 113 of support frame 110 to securely hang the panel unit to the support frame. While this embodiment of the fairing assembly uses keyholes and keyed protrusions to detachably mount to the support frame, other embodiments may use other suitable attachment mechanisms.

Spring loaded cover gates 140 are pivotally connected to each end wall 134, which partially enclose the open rear face of interior 131 when wall panel 150 is deflated and stowed within panel housing 130. Cover gates 140 are flat rectangular sections of a resilient polymer dimensioned to seat within the open rear face of interior 131. Cover gates 140 pivot between an open position extending perpendicularly from the back member 132 and a closed position partially covering the open rear face of interior 131 of panel housing 130. A spring 142 pivotally connects cover gates 140 to end walls 134 and biases the cover gates toward their closed positions. It should be noted that the hinge connection provided spring 142 does not have a fixed shaft or axis of rotation and provides a floating axis of rotation when cover gates pivot between the open and closed position. The floating axis of rotation provides sufficient play in the hinge connection to prevent binding that may damage the inflatable wall panels during deployment or retraction.

Inflatable wall panels 150 are collapsible planar air bladders that deploy outward from panel housing 130 to form the side air foils, which cover or enclose the gaps between tractor truck 20 and trailer 30. The air bladders that form the inflatable wall panels 150 are constructed from sheets of durable, pliable and light weight polymer fabrics. Sections of the fabric are cut, assembled and joined to form panel walls using conventional methods and techniques. Generally seams between joined sections of fabric are sewn and/or bonded together with adhesives.

As shown, inflatable wall panels 150 include a pair of cable retraction units 160, which assist in retracting the wall panels into the panel housing 130 when deflated. Retraction cable units 160 are disposed within the interior of the wall panels themselves. Retraction cable D-ring 160 includes a spring loaded spool 162 enclosed in its own cable housing 164 and a length of wire cable 166 wound around the spool. The ends of wire cables 166 extend through eyelets 152 in the distal ("deployed") edge of wall panels 150 and terminate in a cable stop 168, which secures the cable to the edge of the wall panel.

Inflatable wall panels are detachably connected to panel housings 130 for ease of service, repair and replacement. Inflatable wall panels 150 have D-rings 154 mounted to their top and bottom edges. Clamps 144 engage D-rings 154 to secure the top and bottom edges of wall panels 150 to cover gates 140. The proximal "enclosed" edges of inflatable wall panels 150 are secured to panel housing 130 by suitable bolt fasteners that extend through aligned through bores in back member 132 and cable housing 164.

Each wall panel 150 also has an air line fitting 156 for operatively connecting the wall panel to blower/vacuum 180. Fitting 156 extends from the bottom edge of wall panels 150 and through an opening (not shown) in the bottom end wall 134 of panel housing 130. Each wall panel 150 also includes a plurality of magnet connectors 158, which assist in securely, but detachably holding the distal (deployed) edge of the wall panels to trailer 30 when deployed. Magnet connectors 158 mate with corresponding magnet connectors or metal components (not shown) mounted to the front or side walls of trailer 30. Magnet connectors 158 help prevent wall panels 150 from shifting or flapping during deployment and when tractor-trailer 10 is traveling at high speed or in strong cross winds.

Blower/vacuum 180 is selected and designed to provide both positive and negative air flow to quickly inflate and deflate the wall panels 150 and thereby deploy and retract the wall panels 150 from panel housings 130. During deployment and while deployed, blower/vacuum 180 provides the continuous high velocity air flow into wall panels 150 to inflate and maintain the air pressure within the panels at pressures sufficient to provide a sturdy fairing wall structure. When retracting, blower/vacuum 160 draws air from wall panels 150 to deflate and retract the wall panels back into panel housing 130.

As shown, blower/vacuum 180 is mounted to panel housings 130 of one of the panel units 120 and is connected to both of inflatable wall panels 150 of both panel units 120 by an air line 188. Blower/Vacuum 180 includes two separate drive motors 182 which turn one or more impellers (not shown) enclosed in an impeller housing 186. One motor 182 is activated to drive one or more of the impellers as a blower and the other motor 182 is activated to drive one or more of the impellers as a vacuum pump. During deployment, ambient air is drawn into blower/vacuum 180 through an inlet port 185 in impeller housing 186 and forced through an outlet port 186 in the impeller housing into air line 188. Air line 188 branches from blower/vacuum 180 and is connect to air line fittings 158 of wall panels 150 for each panel unit 120, so that the blower/vacuum services both panel units.

An electronic controller 190 operatively connected to blower/vacuum 180 activates the blower/vacuum to deploy and retract inflatable wall panels 150 at predetermined speeds of tractor-trailer 10. As shown, controller 190 is mounted to panel housing 130 of one of the panel units 120, but may be directly integrated into the blower/vacuum or into the electrical systems of the tractor truck in other embodiments. The design and electronic circuitry used by controller 190 is conventional and commonly used in electronic control systems. The controller will have a central processing unit for function and operational logic, internal memory, an internal clock and I/O terminals for receiving and sending electrical signals, which control the actuation of blower/vacuum 180. Controller 190 is powered using the shared electrical system and power supply of the tractor truck 20. Ideally, controller 190 includes or incorporates a GPS (global positioning satellite) module or circuitry, which acts as a speed sensor for detecting the relative speed of tractor-trailer 10 during operation. In other embodiments, controller 190 may incorporate other types of speed sensors for detecting the relative speed of the tractor-trailer.

In operation, wall panels 150 of each panel unit 120 are deployed from their normally deflated state within panel housing 130. In a stowed position (FIG. 5), inflatable panels 150 are retracted within panel housing 130. When tractor-trailer 10 reaches a predetermined speed, typically over 40 MPH, for a set period of time, typically 5-10 seconds, controller 190 triggers blower/vacuum 180 to inflate wall panels 150 of both panel units 120. As wall panels 150 inflate (FIG. 6), they extend from panel housing 130 and pushing gates 140 outward against the tension of spring 142 (FIG. 12). When fully deployed (FIGS. 1 and 7), the inflated wall panels 150 extend outward to contact trailer 30 and cover the sides of the gaps between the tractor truck 20 and trailer 30. Once deployed, magnet connectors 158 hold the deployed edge of inflated wall panels 150 against trailer 30. The inflated wall panels 150 provide a sturdy air foil for promoting laminar air flow along the sides of tractor-trailer 10. As long as tractor-trailer 10 maintains its speed above the predetermined speed, blower/vacuum 180 continues to provide a continuous high velocity air flow to the inflated wall panels 150, which allows the panels to hold their shape. When the speed of tractor-trailer 10 drops below the predetermined speed, typically 40 MPH, for another set period of time, typically 5-10 seconds, controller 180 triggers blower/vacuum 180 to deflate wall panels 150, thereby retracting the panels back into panel housings 130. Spring tension from spring 142 pivots cover gate 140 inward to partially enclose wall panels 150 within panel housing 130. In the event of a power failure or other failure condition that disables controller 190 and/or blower/vacuum 180, wall panels 150 automatically deflate and retract wall panels 150 back into panel housing 130 under the spring tension of spring 142, which pivots cover gates 140 inward back to their closed positions.

FIGS. 8-14 illustrate another exemplary embodiment of the inflatable aerodynamic fairing assembly of this invention, which is designated generally as reference numerals 200A and 200B. As shown, fairing assemblies 200A and 200B mount to the back of trailers 30 and 40, respectively. Fairing assemblies 200A include three panel units 220 that provide airfoils that cover or enclose the top and sides of the space between trailers 30 and 40. Fairing assemblies 200B include three panel units 220 that provide a "boat tail" style airfoil on the back of trailer 40. It should be noted that the teachings of this invention contemplate the use of an additional four panel unit mounted to the trailers as a bottom fairing, the aerodynamic benefits are typically outweighed by practical drawbacks of a bottom fairing given the structural design and function of the trailers.

Fairing assemblies 200A and 200B are similar in design, function and operation, as fairing assembly 100 described above. Each fairing assembly 200A and 200B includes three or more separate panel units 220, a blower/vacuum 280 servicing each panel unit and an electronic controller. Typically, blower/vacuum 280 and the controller are mounted under the trailer deck to save cargo space and to be out of the way during loading and unloading the trailer. Each panel unit 220 of both fairing assemblies 200A and 200B has a panel housing 230 and an inflatable wall panel 250. Panel housing 230 uses spring loaded cover gate 240, which is similar to that used in fairing assemble 100. Panel housings 230 are mounted to the side and top walls of trailers 30 and 40 and inflatable wall panels 250 deploy and retract from the panel housing along the sides and top of the trailers.

Figure 14:
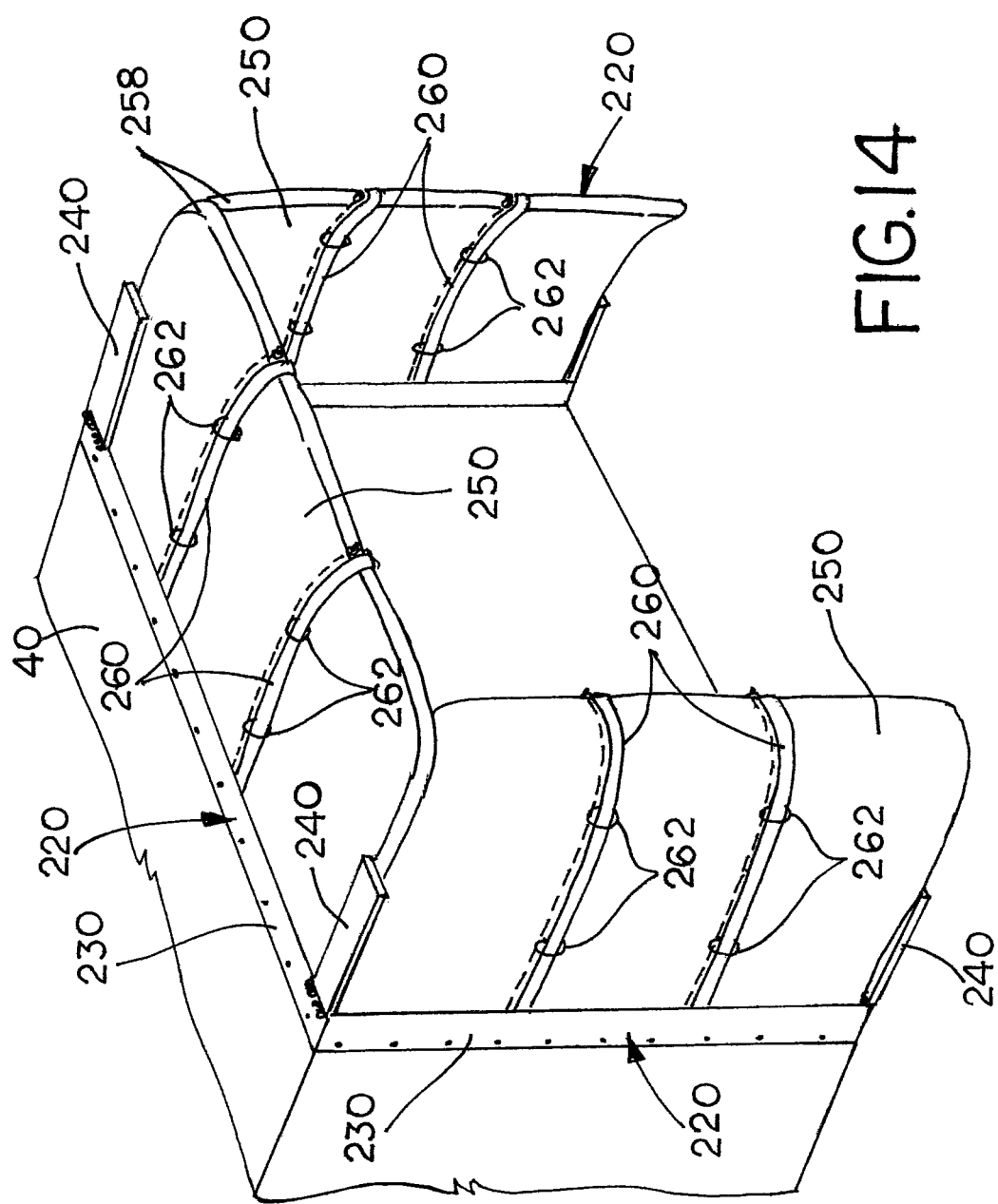
FIG. 14 is a partial rear perspective view of the second fairing assembly of FIGS. 8 and 9 mounted to the last trailer showing the inflatable wall panels fully deployed.

For each fairing assembly 200A and 200B, inflatable wall panels 250 are identical to wall panels 150 above, but add a plurality of external straps 260 to shape and curve the wall panels when fully deployed. Inflatable wall panels 260 incorporate the same cable retraction units as fairing assembles 100, which are used to assist in retracting the wall panels into panel housings 230. External straps 260 are used to shape and curve the distal (deployed) edge of the inflated wall panels 250 to either hug the sides of a following trailer (FIGS. 8-10) or to form a boat tail style airfoil behind a trailer (FIGS. 8-9 and 14). External straps 260 extend across the length of both sides of wall panels 250. Ends of each external strap 260 are affixed the side edges of wall panels 250 and extend generally parallel to the direction of panel deployment. Each strap 260 extends through side mounted D-rings 262 affixed to the sides of wall panels 250. Typically, the length of external straps 260 affixed to the inward facing side of the wall panel are slightly shorter than the length of external straps affixed to the outward facing side of the wall panel, so that when fully inflated, the straps 260 affixed to the inward facing side of wall panel 250 pull and curve the deployed edge of the panel inward when fully deployed. Curving the contour of wall panels 250 when fully deployed allows the distal edge of the wall panel to hug the sidewall of trailer 40 for fairing assembly 200A and to form a "boat tail" style airfoil at the end of trailer 400 for fairing assembly 200B. Straps 260 also assist in hold the shape of the inflated wall panels and prevent the inflated wall panels from shifting or flapping as tractor-trailer 10 travels at highway speeds or in strong cross winds. For fairing assembly 200A, magnet connectors 258 again help hold the distal deployed side edge of the inflated wall panels 250 to the top and sides of trailer 40. For fairing assembly 200B, magnet connectors 258 allow the three wall panels 250 to be interconnected.

One skilled in the art will note the following advantages of this invention over the existing rigid panel fairing systems and fixed airfoils and fairings. The fairing assembles of this invention use inflatable panels that automatically deploy and retract at certain speeds to provide sturdy, light-weight fairings, which enclose or cover the space between the tractor truck and connected trailers to improve the aerodynamics of the tractor-trailers. The fairing assemblies can be readily adapted to accommodate structural variations in the design of individual tractor trucks and trailers. The modular design of the fairing assemblies allows individual units and components to be easily accessed, maintained, repaired and/or replaced.

The use of inflatable wall panels reduces the weight, cost and mechanical complexity, and improves the functionality, reliability and maintenance of the fairing assembly compared to conventional rigid panel systems. The use of inflatable wall panels also completely covers and enclosed the gaps between the tractor truck and trailers while allowing for relative movement between the tractor trucks and trailers and changes in the kingpin setup on the tractor trucks. When deployed, the blower/vacuum provides a continuous high velocity air flow to the inflatable wall panels to maintain their structural integrity and provide a sturdy fairing. While sturdy, the inflatable wall panels are pliable and conform to the contact surfaces of the connected trailers to fully cover and enclose the gaps.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An aerodynamic fairing assembly for a tractor-trailer, the fairing assembly comprising:
    a panel unit adapted to mount to the tractor-trailer, the panel unit includes a panel housing defining an interior thereof, and an inflatable wall panel connected to the panel housing for extensible movement between a deployed position where the wall panel is inflated and extends outward from the panel housing to act as an aerodynamic fairing and a retracted position where the wall panel is deflated and is collapsed and disposed within the panel housing;
    a blower operatively connected to the fairing panel for inflating and deflating the inflatable panel; and
    a controller for selectively actuating the blower to move the inflatable wall panel between the deployed position and retracted position,
    the inflatable wall panel includes an internal air bladder and has a first end edge connected to the panel housing and a second end edge opposite the first end edge spaced from the panel housing when the inflatable wall is in the deployed position,
    the inflatable wall panel also includes a retraction unit for collapsing the inflatable wall panel when deflated from the deployed position to the retracted position, the retraction unit includes a spool housing connected to the inflatable wall panel, a spool rotatably disposed within the spool housing and a cable wound about the spool and having a cable end retractably extending from the spool housing and affixed to the second end edge of the inflatable wall panel through the internal air bladder.

2. The fairing assembly of claim 1 wherein the inflatable wall panel includes a magnet part affixed to the second end edge of the inflatable wall panel for securely holding the second end edge to the tractor-trailer when the inflatable wall panel is in the deployed position.

3. The fairing assembly of claim 1 wherein the inflatable wall panel includes an air line fitting extending through an opening in the panel housing for connecting the air bladder to the blower.

4. The fairing assembly of claim 1 wherein the inflatable wall panel is detachably connected to the panel housing.

5. The fairing assembly of claim 1 wherein the panel housing includes an elongated back member and a cover gate pivotally connected to the back member for hinged movement between a closed position partially covering the panel housing interior and an open position spaced from the panel housing interior.

6. The fairing assembly of claim 1 wherein the blower provides a continuous air flow to the inflatable wall panel when the inflatable wall panel is in the deployed position.

7. The fairing assembly of claim 1 wherein the blower draws an air flow from the inflatable wall panel when the inflatable wall panel moves from the deployed position to the retracted position.

8. The fairing assembly of claim 1 wherein the blower includes an impeller, a first motors operatively connected to the impeller to turn the impeller to generate an air flow to the inflatable wall panel, and a second motor operatively connected to the impeller to turn the impeller to draw an air flow from the inflatable wall panel.

9. The fairing assembly of claim 1 wherein the controller actuates the blower to move the inflatable wall panel between the deployed position and retracted position automatically when the tractor-trailer travels predetermined speeds for predetermined periods of time.

10. The fairing assembly of claim 1 wherein the panel unit also include a support frame fixed to the tractor-trailer for detachably connecting the panel unit to the tractor-trailer.

11. An aerodynamic fairing apparatus for a tractor-trailer, where the tractor-trailer includes a tractor truck and a connected trailer, the fairing apparatus comprising:
a panel unit adapted to mount to the tractor-trailer, the panel unit includes a panel housing defining an interior thereof, and an inflatable wall panel connected to the panel housing for extensible movement between a deployed position where the wall panel is inflated and extends outward from the panel housing to act as an aerodynamic fairing that extends between the tractor truck and the connected trailer and a retracted position where the wall panel is deflated and is collapsed and disposed withing the panel housing;
a blower operatively connected to the fairing panel for inflating and deflating the inflatable panel; and
a controller for selectively actuating the blower to move the inflatable wall panel between the deployed position and retracted position,
the inflatable wall panel includes an internal air bladder and has a first end edge connected to the panel housing and a second end edge opposite the first end edge spaced from the panel housing when the inflatable wall is in the deployed position,
the inflatable wall panel also includes a retraction unit for collapsing the inflatable wall panel when deflated from the deployed position to the retracted position, the retraction unit includes a spool housing connected to the inflatable wall panel, a spool rotatably disposed within the spool housing and a cable wound about the spool and having a cable end retractably extending from the spool housing and affixed to the second end edge of the inflatable wall panel through the internal air bladder.

12. The fairing assembly of claim 11 wherein the inflatable wall panel includes a magnet part affixed to the second end edge of the inflatable wall panel for securely holding the second end edge to the tractor-trailer when the inflatable wall panel is in the deployed position.

13. The fairing assembly of claim 11 wherein the inflatable wall panel includes an air line fitting extending through an opening in the panel housing for connecting the air bladder to the blower.

14. The fairing assembly of claim 11 wherein the inflatable wall panel is detachably connected to the panel housing.

15. The fairing assembly of claim 11 wherein the panel housing includes an elongated back member and a cover gate pivotally connected to the back member for hinged movement between a closed position partially covering the panel housing interior and an open position spaced from the panel housing interior.

16. The fairing assembly of claim 11 wherein the blower provides a continuous air flow to the inflatable wall panel when the inflatable wall panel is in the deployed position.

17. The fairing assembly of claim 11 wherein the blower draws an air flow from the inflatable wall panel when the inflatable wall panel moves from the deployed position to the retracted position.

18. The fairing assembly of claim 11 wherein the blower includes an impeller, a first motors operatively connected to the impeller to turn the impeller to generate an air flow to the inflatable wall panel, and a second motor operatively connected to the impeller to turn the impeller to draw an air flow from the inflatable wall panel.

19. The fairing assembly of claim 11 wherein the controller actuates the blower to move the inflatable wall panel between the deployed position and retracted position automatically when the tractor-trailer travels predetermined speeds for predetermined periods of time.

20. The fairing assembly of claim 11 wherein the panel unit also include a support frame fixed to the tractor truck for detachably connecting the panel unit to the tractor truck.

21. The fairing assembly of claim 11 and a second panel unit, the second panel unit includes a second panel housing and a second inflatable wall panel connected to the panel housing for extensible movement between a deployed position where the wall panel is inflated and extends outward from the second panel housing to act as a second aerodynamic fairing that extends between the tractor truck and the connected trailer and a retracted position where the second inflatable wall panel is deflated and is collapsed and disposed within the second panel housing, the blower operatively connected to the second panel unit for inflating and deflating the second inflatable panel, the controller selectively actuating the blower to move the second inflatable wall panel between the deployed position and retracted position.

* * * * *